Oct. 14, 1958 M. ZAID 2,855,779
ANGLE-OF-ATTACK AND YAW INDICATING APPARATUS
Filed Nov. 4, 1954 3 Sheets-Sheet 2

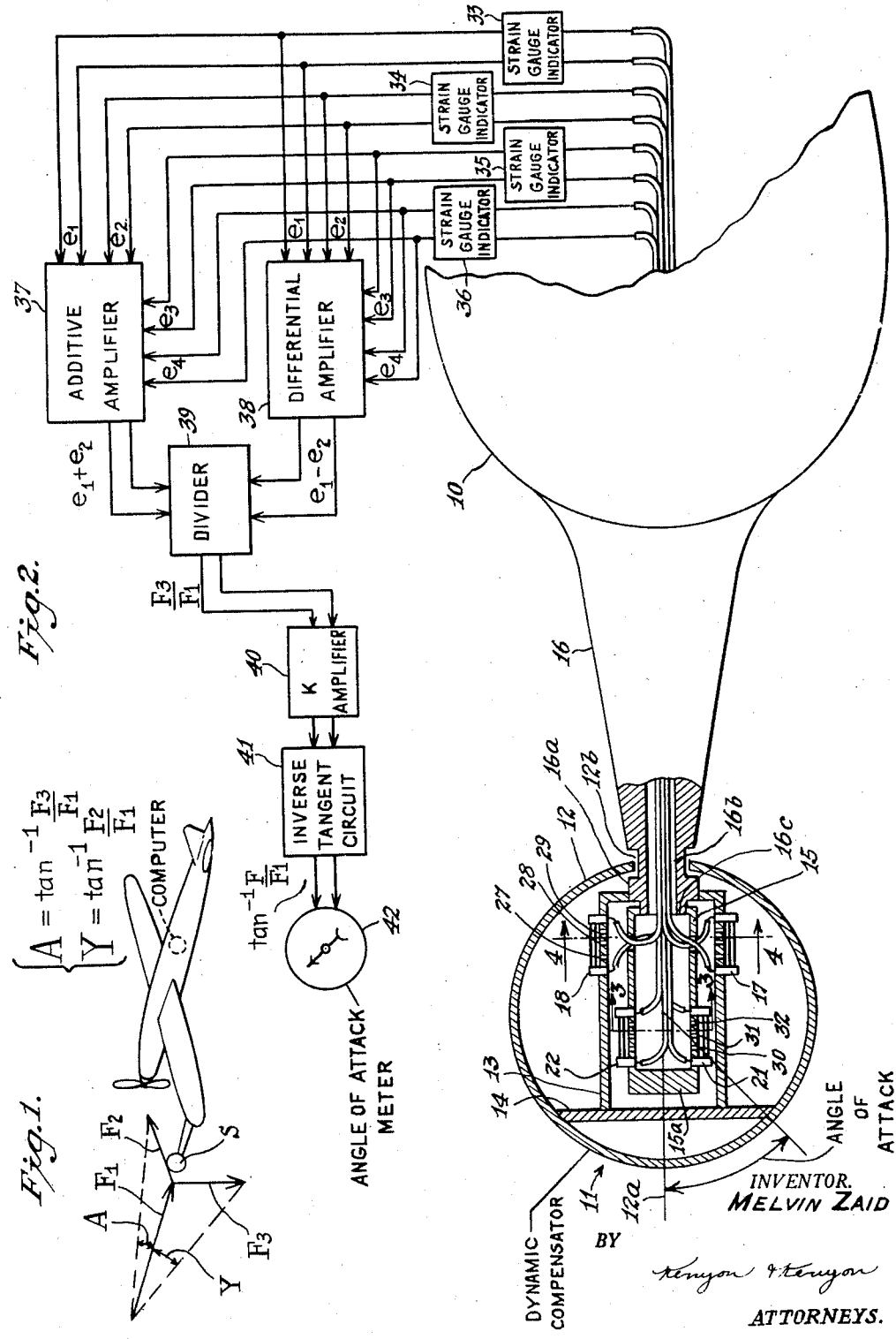

INVENTOR.
MELVIN ZAID
BY
Kenyon & Kenyon
ATTORNEYS.

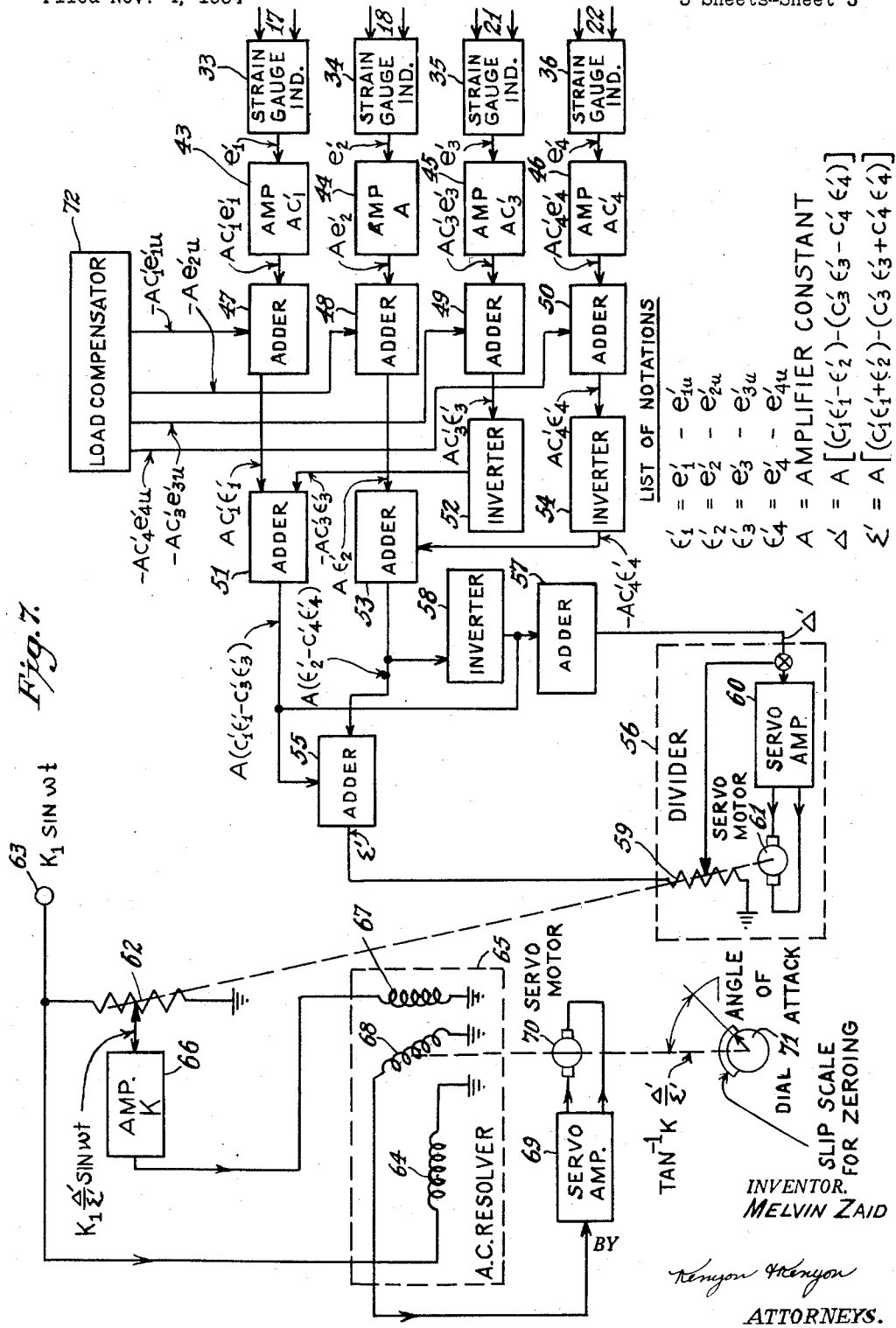

United States Patent Office 2,855,779
Patented Oct. 14, 1958

2,855,779

ANGLE-OF-ATTACK AND YAW INDICATING APPARATUS

Melvin Zaid, Levittown, N. Y., assignor to Bulova Research and Development Laboratories, Inc., Flushing, N. Y., a corporation of New York Application November 4, 1954, Serial No. 466,751

16 Claims. (Cl. 73—180)

The present invention relates generally to instruments for indicating the relative angular position of an airplane with respect to the air stream, and more particularly to improvements in angle-of-attack and yaw indicators.

In maneuvering an airplane, indications of the angle-of-attack are of value in showing the existence of conditions of flight under which stalling may occur. One instrument in common use for this purpose is the vane type meter wherein a vane is disposed in the air stream in parallel relation thereto, such that it will be balanced on both sides against deflection. In the event the craft carrying the device departs from its straight line position in the air stream, one side of the vane will be subjected to greater pressure than the other side, whereby the vane is caused to seek its position of equilibrium. This shift in vane position is transmitted by a gear mechanism to an indicator. Due to frictional losses in the gear mechanism as well as back-lash effects, such meters are inaccurate and unreliable.

In another known type of indicator, the pressure differential set up between two pressure transmitting ports formed in opposed surfaces of the aircraft is utilized, the differential pressure being conveyed to the meter through relatively long tubes. Such indicators are insensitive and afford readings which are inexact.

In view of the foregoing it is the chief object of the invention to provide new and useful angle-of-attack and yaw indicating apparatus characterized by a high degree of sensitivity and accuracy.

More particularly, it is an object of the invention to provide apparatus utilizing energy from the air stream operative on strain-responsive electrical means to effect actuation of the indicators. A significant feature of the invention resides in the use of a sphere-enclosed sensing boom attached to the air foil or wing of the aircraft, the boom supporting a plurality of strain gauge elements so oriented that wind forces impinging on the sphere are transmitted to the boom. By using two sets of elements, one responsive to the angle-of-attack and the other responsive to the angle of yaw, flight indications in both lateral and vertical axes can be obtained. These indications are available to the pilot for manual control of the plane position or they may be transformed by conventional means into control voltages for automatically governing a flight stabilization mechanism.

It is also an object of the invention to provide a helically-wound strain gauge element of exceptional sensitivity.

A further object of the invention is to provide a tubular sensing boom having slots therein to form a lattice structure adapted to impart a lower effective modulus to the boom, the slots being selected to obtain the exact longitudinal and flexural rigidity required without unduly physically weakening the boom. The use of helically-wound strain gauge elements arranged to span the lattice of the boom at circumferentially spaced positions thereon results in a wind-sensing assembly of extreme sensitivity.

Yet another object of the invention is to provide an electronic computing system adapted to translate strain indications into angle-of-attack and yaw angle readings. Another important aspect of the invention is the use of a dynamic compensator to balance out errors inherent in the strain gauges, such as those arising from ambient temperature changes.

Briefly stated, an instrument in accordance with the invention comprises a cylindrical sensing boom on diametrically opposed sides of which are mounted two electrical strain gauges, the boom being surrounded by a sensing sphere and being attached at one end thereto, whereby wind forces impinging on the sphere are transmitted to the boom to impart stresses thereto. The strain indications developed by the gauges are combined additively and also differentially to provide indications of two orthogonal force components of the incident wind, which force components are then divided to produce a quotient value whose inverse tangent is determined to afford a reading of relative wind direction.

For a better understanding of the invention as well as other objects and further features thereof, reference is had to the following detailed description to be read in connection with the accompanying drawings wherein like elements in the several views are identified by like reference numerals.

In the drawings:

Fig. 1 is a diagram of the components of force on an object in an air stream, illustrative of the theory of the invention.

Fig. 2 illustrates in longitudinal section a sensing assembly in accordance with the invention coupled to an electronic computing system for measuring the angle-of-attack, the computing system being shown in block diagram.

Fig. 7 is a schematic and block diagram illustrating another preferred embodiment of an electronic computer system adapted for coupling to the sensing boom assembly shown in Fig. 2.

*Theory of operation*

The purpose of the aircraft instrument disclosed herein is to indicate the angle between the airstream relative to the line of symmetry of the plane in the plan view, this line being arbitrarily prescribed in the elevational view. The angle measured in the elevational view is called the angle-of-attack and in the plan view the yaw angle.

It is assumed that when a symmetrical body, such as sphere S in Fig. 1, is placed in an air stream, the force impinging thereon will be in the direction of the air stream. Thus if one measures the direction of the force on the sphere, he has the direction of the relative wind. As shown in the figure the sphere S projects forwardly from the airfoil of a plane in flight.

Let us further assume that enclosed within the sphere are strain gauges which are oriented to respond to three orthogonal components of load acting on the sphere. These components relative to the plane of symmetry of the aircraft are $F_1$, the longitudinal component; $F_2$, the perpendicular component; $F_3$, the parallel component. Thus when the sensing S sphere is subjected to a wind force, the three components of force are immediately known. These are proportional to the components of wind direction. In dimensionless notation, the directional components are given by 1, $$\frac{F_2}{F_1}, \frac{F_3}{F_1}$$

In this it is assumed that $F_1$ does not go to zero, otherwise it would be necessary to divide by $F_2$ or $F_3$. This can happen only in the very rare case of a 90° angle-of-attack. By a suitable computer mechanism, electrical or mechanical, the angle of attack A and the yaw angle Y can be determined by solving the following equations:

$$\text{Angle of attack } A = \tan^{-1}\frac{F_3}{F_1}$$

$$\text{Yaw angle } Y = \tan^{-1}\frac{F_2}{F_1}$$

*The angle of attack and yaw angle sensing assembly*

Figure 3:
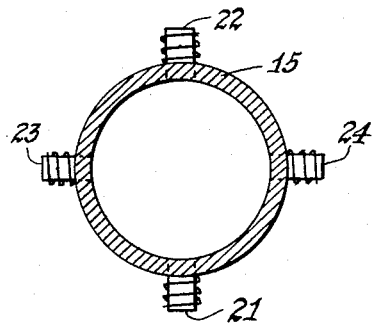
Fig. 3 is a transverse section taken in the plane 3—3 in Fig. 2.
Figure 4:
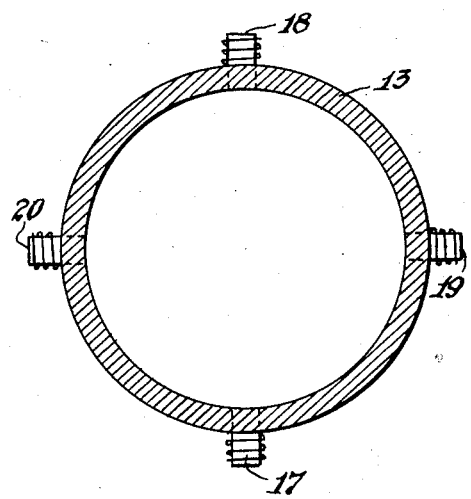
Fig. 4 is a transverse section taken in the plane 4—4 in Fig. 2.

Referring now to Figs. 2 to 4, projecting forwardly from the airfoil or wing 10 of an airplane is a wind sensing assembly, generally designated by numeral 11. The major components of the assembly comprise a sensing sphere 12, a tubular sensing boom 13, a disc 14 for supporting said sphere on the end of said boom, a compensator column 15, and a conical mounting post 16.

Sphere 12 is preferably constituted by a thin, lightweight metal, such as magnesium and is designed to have a relatively high resonance peak of 300 to 500 cycles or more. To minimize vibration and flutter problems, it is desirable that the natural frequency exceed 500 cycles per second. Disc 14, which is formed of a rigid metal, is secured at its periphery to the inner wall of the sphere and is positioned in a chordal plane perpendicular to the longitudinal axis 12a of the sphere.

Sensing boom 13 is constituted by a steel tube coaxially disposed within sphere 12, the upper end of the tube being enclosed by and secured to disc 14. The lower end of boom 13 is affixed to the enlarged head 16a of the mounting post, which head extends into the sphere 12 through an opening 12b therein. Post 16 is provided with a constricted or neck portion 16b whose diameter is somewhat smaller than the opening 12b in the sphere, whereby the sphere is free to shift in response to wind pressure.

Column 15 is concentrically disposed within boom 13, the lower end thereof being affixed to the terminal cap 16c of the mounting post. Enclosing the upper end of column 15 is a block 15a, having a predetermined mass such that the resonance characteristic of the column matches that of the sensing sphere-boom combination.

Circumferentially mounted adjacent the lower end of the sensing boom 13 and in quadrature relation thereon are four strain gauge elements 17, 18, 19 and 20. Elements 17 and 18 are at diametrically opposed positions and lie in a plane parallel to the plane of symmetry of the aircraft. Elements 19 and 20 are at diametrically opposed positions perpendicular to a line passing through elements 17 and 18 and to the plane of symmetry of the aircraft. Circumferentially arranged adjacent the upper end of the compensator column 15 are four strain gauge elements 21, 22, 23 and 24, the relative positions of these elements corresponding to those of elements 17, 18, 19 and 20. As shown in Fig. 2 the mounting post 16 is of hollow construction, the electrical leads from the several strain gauge elements passing therethrough for connection to a computer system located within the aircraft.

Figure 5:
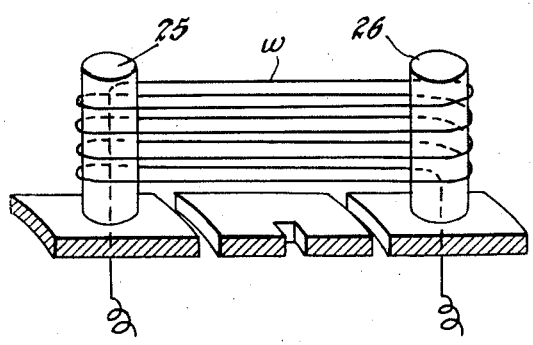
Fig. 5 is a perspective view of a strain gauge element in accordance with the invention.

The strain gauges are adapted to measure mechanical deformation of the body to which they are attached, the gauges functioning to convert the mechanical stresses into changes of electrical resistance value. Each of the gauges, as shown separately in Fig. 5 is constituted by a pair of externally-threaded insulating pegs 25 and 26 mounted at spaced positions on the specimen under stress, and a strain-sensitive wire helix W stretched between the spaced pegs. Wire W is helically wound to span the two pegs, the wire being received and held within the spiral grooves of the pegs. Thus the overall length of the wire is far greater than the linear distance between the pegs; and a relatively small displacement between the pegs, as a result of a deforming stress, gives rise to a relatively large change in electrical resistance in the wire helix spanning the pegs. This change in electrical resistance may be translated by conventional circuits, such as an electrical bridge arrangement, into a proportional voltage value and then applied to a voltmeter to afford a strain reading. By reason of the extreme sensitivity of this gauge structure the gauge is capable of detecting minute deformations in the surface being investigated.

The following is a preferred technique for making the gauges: The pegs are first inserted at spaced positions in the tube or surface to be stressed, one end of the strain-sensitive wire being clamped to the top peg. A weight in the order of 5 to 10 grams is attached to the other end of the wire, and the tube revolved end over end; thereby winding the wires around the peg under steady load. At each half turn a drop of cement is applied to the wires at the pegs so as to obviate slippage. Finally after the desired number of turns is wound, the wire is clamped on the lower peg and the gauge completed. The leads extend from the clamps on each peg and pass through a central bore in the pegs. Rather than cement the wire to the peg, the groove therein may be so shaped as to cause the wire to lock in place when inserted.

Figure 6:
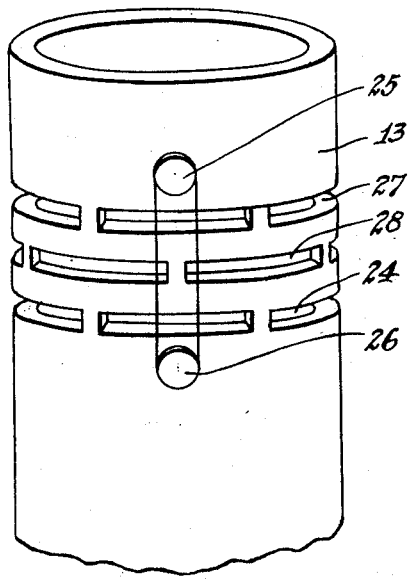
Fig. 6 is a perspective view of the lattice portion of the sensing boom.

As shown separately in Fig. 6, formed at longitudinally displaced positions along the boom cylinder are a series of rings 27, 28 and 29, each constituted by circumferentially arranged arcuate slots. The arrangement is such that the slots in one ring are angularly displaced relative to those in the adjacent rings, whereby the resultant lattice is constituted by curved beams interconnected by bars. The four strain gauges are disposed in the longitudinal direction with their pegs so positioned that they span or bridge the lattice formed on the boom. A stress imposed on the boom tends to flex the curved beams of the lattice thereby narrowing or widening the slots depending on the direction of stress.

The lattice structure gives the boom a lower effective modulus, and by proper design these slots can be selected to obtain the exact longitudinal and flexural rigidity required, but still leave an otherwise rugged boom tube. By calculating the lattice of curved beams, the longitudinal rigidity can be obtained. Flexural considerations involve torsion of the lattice as well as extension or compression. By calculations both as to longitudinal and flexural rigidities, the size of the slots, the distance between slots, the wall thickness, etc., can be determined in advance for any desired result.

The same considerations apply to the compensator column 15 which also has slotted therein a series of rings 30, 31 and 32 to form a lattice across which strain gauge elements 21, 22, 23 and 24 are bridged. The lattice structure acts to magnify the slightest force impressed on the tube, the resultant displacement being detected by elements 21 to 24.

*Operation of sensing assembly*

As pointed out in the section on the theory of operation, in order to measure the angle of attack, the value of the force $F_1$, the longitudinal component, and $F_3$, the parallel component, must first be determined. Let us assume that the voltage developed by element 17 is represented by $e_1$ and that by element 18 is represented by $e_2$. It will be evident therefore that the force $F_1$, will be impressed on the sphere along the axial line 12a in Fig. 2, and the force $F_3$ will be impressed on the sphere orthogonally relative to force $F_1$.

Hence in terms of the resultant voltage developed by the strain gauges 17 and 18, $F_1$ will be represented by $e_1$ plus $e_2$, while $F_3$ will be represented by $e_1$ minus $e_2$. Hence to arrive at the value of $F_1$ in electrical terms it is necessary only to amplify the values of $e_1$ and $e_2$ additively. To arrive at the value of $F_3$ it is necessary only to amplify the values of $e_1$ and $e_2$ differentially. Having converted $F_1$ and $F_3$ into electrical terms, one can now solve for the angle of attack by dividing $F_3$ by $F_1$ and obtaining the inverse tangent of the quotient value, this also being accomplished by suitable electronic computer means.

Thus far it has been assumed that elements 17 and 18, which generate voltages $e_1$ and $e_2$ are ideal elements, hence are responsive solely to applied strains. However in actual practice, the strain gauge elements are also responsive to ambient temperature effects and other sources of error, whereby correction means therefor are essential.

With this in mind, there is provided a dynamic compensator in the form of elements 21 and 22 which are mounted on column 15 and are subjected to the same influences as elements 17 and 18, save that they are isolated from air stream stresses. As pointed out previously, the dynamic compensator column is designed to have the same resonance characteristics as the sensing boom.

The voltages $e_3$ and $e_4$ developed by gauges 21 and 22, respectively, dynamically reflect the changes in resistance values which arise from conditions other than the wind forces. Hence by feeding voltages $e_3$ and $e_4$ in polar or phase opposition to voltages $e_1$ and $e_2$ in the additive and differential amplifiers, respectively, a balancing out of spurious factors will result, thereby providing accurate indications of the $F_1$ and $F_3$ forces independent of ambient temperature and dynamic effects.

With respect to the determination of yaw angle, the forces $F_1$ and $F_2$ are converted into electrical values by elements 19 and 20 and compensation is effected by elements 23 and 24. The electrical computer system is otherwise identical to that described in connection with the angle of attack indication.

The electronic computer (1st)

As pointed out in the previous section, to measure the angle-of-attack, it is necessary to convert the strain gauge indications into indications for $F_1$ and $F_3$ and then to solve the equation for the angle-of-attack. This is accomplished as shown in Fig. 2 by coupling strain gauge indicators 33, 34, 35 and 36, of standard design, to the elements 17, 18, 21 and 22, respectively. Yielded in the output of indicator 33, 34, 35 and 36 are electrical voltages represented by $e_1$, $e_2$, $e_3$ and $e_4$.

The outputs of indicators 33 and 34 are connected to the input of an additive amplifier 37, which yields a voltage $e_1$ plus $e_2$ representing force $F_1$. The outputs of indicators 33 and 34 are also connected to the input of differential amplifier 38 yielding a voltage $e_1$ minus $e_2$ representing force $F_3$. Also applied both to amplifiers 37 and 38 are the outputs of indicators 35 and 36 in polar or phase opposition to the outputs of indicators 33 and 34 to effect balancing out with respect to spurious factors.

To divide $F_3$ by $F_1$, the outputs of amplifiers 37 and 38 are fed to a divider circuit 39 of suitable design. One such device may take the form of a multiplying circuit having feedback means, as described for example in "Waveforms," volume 19, edited by Britton Chance et al., McGraw-Hill Book Co., Inc., 1949, Section 19–2, Figure 19–1.

The voltage developed in the output of divider 39 and representing $F_3/F_1$ is then fed through a K amplifier 40 whose amplification factor is based on a constant K, into an inverse tangent circuit 41, to develop a voltage providing an index to the angle-of-attack. Circuits for solving inverse trigonometric functions are well known, one suitable circuit for the present purpose being disclosed in "Electronic Instruments," edited by Ivan A. Greenwood, Jr., et al., McGraw Hill Book Co., Inc., 1948, Section 5–10, Figure 5–28. Finally, the voltage generated by the inverse tangent circuit 40 is applied to a voltmeter 42 calibrated to afford readings of angle-of-attack.

It will be appreciated that the circuit for yaw indications is identical in all respects to the foregoing, save that the circuit is connected to strain gauge elements 19, 20, 23 and 24. It is also to be understood that a mechanical computer circuit may be used in lieu of the electronic circuit disclosed herein.

The electronic computer (2nd)

In the computer shown in Fig. 7 load compensation means are included, the circuit in its essential detail being otherwise similar to that disclosed in Fig. 1. The output voltages from strain gauge indicators 33 to 36 are represented by values $e'_1$, $e'_2$, $e'_3$ and $e'_4$, respectively. The outputs of indicators 33 to 36 are fed to amplifiers 43 to 46 having amplification factors $AC'_1$, $A$, $AC'_3$ and $AC'_4$, respectively.

The output of amplifier 43 is represented by a value $AC'_1 e_1$, that of amplifier 44 by $Ae'_2$, that of amplifier 45 by $AC'_3 e'_3$ and that of amplifier 46 by $AC'_4 e'_4$. These outputs are applied to adder circuits 47, 48, 49 and 50, respectively. A load compensator 72 is provided which applies a voltage $-AC'_1 e'_{1u}$ to adder 47, a voltage $-Ae'_{2u}$ to adder 48, a voltage $-AC'_3 e'_{3u}$ to adder 49, and a voltage $-AC'_4 e'_{4u}$ to adder 50.

The output $AC'_1 E'_1$ of adder 47 is applied to an adder 51, to which is also applied a voltage $-AC'_3 E'_3$ derived from adder 49 after inversion thereof in an inverter 52. The output $AE'_2$ from adder 48 is applied to an adder 53, to which is also fed a voltage $-AC'_4 E'_4$ derived from adder 50 after inversion in an inverter 54.

The output $A(C'_1 E_1 - C'_3 E'_3)$ yielded by adder 51 is fed to an adder 55 in combination with the output $A(E'_2 - C'_4 E'_4)$ from adder 53 to produce an output $\Sigma'$ which is fed to one input of a divider 56. The output of adder 51 is fed to an adder 57 in combination with the output derived from adder 53 through an inverter 58 to produce a voltage $\Delta'$ which is fed to the other input of divider 56.

The voltage $\Sigma'$ is applied in divider 56 across a potentiometer 59 while the voltage $\Delta'$ is fed to a servo amplifier 60 activating a servomotor 61 to position the movable tape of the potentiometer to a point depending on value $\Delta'$ divided by $\Sigma'$. Potentiometer 59 is ganged to the movable tap on a potentiometer 62, across which is applied at terminal 63 a sinusoidal voltage $K_1 \sin wt$., this voltage also being impressed on one stator 64 of an A.-C. resolver 65. The voltage $$K_1 \frac{\Delta'}{\Sigma'} \sin wt.$$

established at the tap of potentiometer 62 is fed through an amplifier 66 having an amplification K to the second stator 67 of the resolver. The rotor 68 is electrically coupled to the input of a servo amplifier 69 whose output is fed to a servomotor 70 mechanically linked to rotor 68, whereby the servomotor is caused to assume a position depending on $$\tan^{-1} K \frac{\Delta'}{\Sigma'}$$

The shaft of motor 70 is linked to a suitably calibrated meter 71 for indicating the angle of attack.

It is to be understood that the invention is not limited to measurements of angle-of-attack and yaw angle but is applicable to any situation in which it is desired to measure a strain producing directional force.

While there has been shown what are considered to be preferred embodiments of the invention, it is obvious that many changes and modifications may be made therein without departing from the essential spirit of the invention. It is intended therefore in the appended claims to cover all such changes and modifications as fall within the true scope of the invention.

What is claimed is:

1. Apparatus for indicating the direction of a strain-producing force comprising a sensing assembly including a cylindrical sensing boom and a pair of electrical strain gauges mounted thereon at diametrically opposed positions and responsive to the force transmitted to the boom to produce strain indications reflecting the direction of said force, a sensing sphere surrounding said boom and affixed to one end thereof to stress same in accordance with an impinging wind force, means coupled to said gauges to measure the additive value of said indications to determine one component of said force, and means coupled to said gauges to measure the differential value of said indications to determine a second and orthogonal component of said force.

2. Apparatus, as set forth in claim 1, further including means to divide said second component value by said first component value and to obtain the inverse tangent of the quotient value to provide an index to the direction of said force.

3. Apparatus for indicating the direction of a strain-producing force comprising a sensing assembly including a cylindrical sensing boom and a pair of electrical strain gauges mounted thereon at diametrically opposed positions and responsive to the force transmitted to the boom to produce strain indications reflecting the direction of said force, a sensing sphere surrounding said boom and affixed to one end thereof to stress same in accordance with an impinging wind force, means coupled to said gauges to determine the additive value of said indications, means coupled to said gauges to determine the differential value of said indications, means to divide said differential value by said additive value to produce a quotient value, means to obtain the inverse tangent of said quotient value to obtain a trigonometric value, and a meter responsive to said trigonometric value to afford a reading of force direction.

4. A wind-sensing assembly comprising a cylindrical sensing boom, a pair of electrical strain gauges mounted at diametrically opposed positions on said boom, a sensing sphere surrounding said boom and affixed to one end thereof to stress same in accordance with an impinging wind force, and a support for said boom extending into said sphere through an opening therein and attached to the other end of said boom, said opening being dimensioned to permit a deflection of said sphere relative to said support.

5. A wind-sensing assembly comprising a cylindrical sensing boom, a pair of electrical strain gauges mounted at diametrically opposed positions on said boom, a sensing sphere surrounding said boom, a disc within said sphere at a chordal position therein and affixed to the inner wall thereof, one end of said boom being attached to said disc whereby said boom is stressed in accordance with the direction of a wind force impinging on said sphere, and a support for said boom extending into said sphere through an opening therein and attached to the other end of said boom, said opening being dimensioned to permit deflection of said sphere relative to said support.

6. An assembly as set forth in claim 5, wherein said sphere has a relatively high natural resonance peak.

7. A wind-sensing assembly comprising a cylindrical sensing boom and four stress gauges circumferentially mounted on said boom at positions in quadrature relation, a sensing sphere surrounding said boom and affixed to one end thereof to stress same in accordance with an impinging wind force, and a support for said boom extending through said sphere through an opening therein and attached to the other end of said boom, said opening being dimensioned to permit deflection of said sphere relative to said boom.

8. An assembly as set forth in claim 7 wherein said sphere is formed of magnesium and has a natural resonance peak in excess of 500 cycles per second.

9. A wind-sensing assembly comprising a cylindrical sensing boom, a pair of electrical strain gauge elements mounted at diametrically opposed positions on said boom, a sensing sphere surrounding said boom and secured to one end thereof to stress same in accordance with the direction of wind force impinging thereon, a compensator column concentrically disposed within said boom, and a second pair of electrical strain gauge elements mounted at diametrically opposed positions on said column corresponding to the positions of said first pair.

10. An assembly as set forth in claim 9 wherein said sphere has a relatively high natural resonance characteristic, and further including a weight secured to said column to impart a frequency characteristic thereto to match the resonance of said sphere.

11. A wind-sensing assembly comprising a cylindrical sensing boom, a first set of four strain gauge elements circumferentially mounted on said boom at positions in quadrature relation, a compensator column concentrically disposed within said boom, a second set of four strain gauge elements circumferentially mounted on said column at positions corresponding to the elements of the first set, a sphere surrounding said boom and coaxial therewith, a rigid disc within said sphere and peripherally secured thereto, said disc lying in a chordal plane normal to the axis of the sphere, one end of said boom being affixed to said disc, said sphere having a predetermined resonance characteristic, and a weight secured to one end of said column and having a mass imparting to said column a resonance characteristic matching said sphere.

12. A stress-sensing device comprising a tubular boom subjected to stress, said boom being formed with a series of arcuate slots spaced around the circumference and similar slots spaced therefrom longitudinally of the tubular boom to define a lattice constituted by curved beams and connecting bars, and four strain gauge elements pin-mounted on said boom to bridge said lattice, said elements being positioned in quadrature relation.

13. Apparatus for indicating the direction of a yaw force comprising a sensing assembly including a cylindrical sensing boom and a pair of strain gauges mounted thereon at diametrically opposed positions and responsive to the force relative to said assembly, a sensing sphere surrounding said boom and affixed to one end thereof to stress same in accordance with an impinging wind force, and an electronic computer coupled to said gauges and including an additive amplifier to produce a first voltage aggregating the indications of said gauges, a differential amplifier to produce a second voltage subtracting said indications, a divider circuit coupled to said amplifiers to divide said second voltage by said first voltage to produce a quotient voltage, and an inverse tangent circuit coupled to said divider circuit to provide a voltage value which is an index to the direction of said force.

14. Apparatus, as set forth in claim 13 further including a dynamic compensator cylindrical column concentrically disposed within said boom and having a second pair of strain gauges mounted at diametrically opposed positions thereon, and means to apply the outputs of said second pair of strain gauges to said amplifiers in polar opposition to the outputs of said first pair to balance out spurious factors.

15. Apparatus for indicating the angle-of-attack of a wind stream relative to an aircraft, comprising a wind-sensing assembly mountable on the airfoil of said aircraft and including a sensing boom having a pair of electrical strain gauge elements mounted thereon at diametrically opposed positions and a sensing sphere surrounding said boom and secured to one end thereof, a dynamic compensator column concentrically mounted within said boom and having a second pair of strain gauge elements mounted thereon at diametrically opposed positions, and an electronic computer located within said aircraft and including first amplifier means to add the indications of said boom gauges, said column gauge outputs being applied additively to said first amplifier means in polar opposition to said boom gauges, second amplifier means to subtract the indications of said boom gauges, said column gauge outputs being applied differentially to said second amplifier means in polar opposition to said boom gauges, a divider circuit coupled to said first and second amplifier means to produce a quotient value voltage, an inverse tangent circuit coupled to said divider to produce a voltage providing an index to the angle-of-attack, and a meter coupled to said inverse tangent circuit calibrated to provide angle readings.

16. Apparatus as set forth in claim 15, further including means to supply load compensating voltages to said amplifier means.

References Cited in the file of this patent
UNITED STATES PATENTS

| | | |
|---|---|---|
| 2,059,549 | Carlson | Nov. 3, 1936 |
| 2,098,099 | Kahn | Nov. 2, 1937 |
| 2,125,365 | Waller | Aug. 2, 1938 |
| 2,462,577 | Warren | Feb. 22, 1949 |
| 2,485,977 | Mains | Oct. 25, 1949 |
| 2,487,595 | Ruge | Nov. 8, 1949 |
| 2,543,020 | Hess | Feb. 27, 1951 |
| 2,544,738 | Tint | Mar. 13, 1951 |